Figure 9:
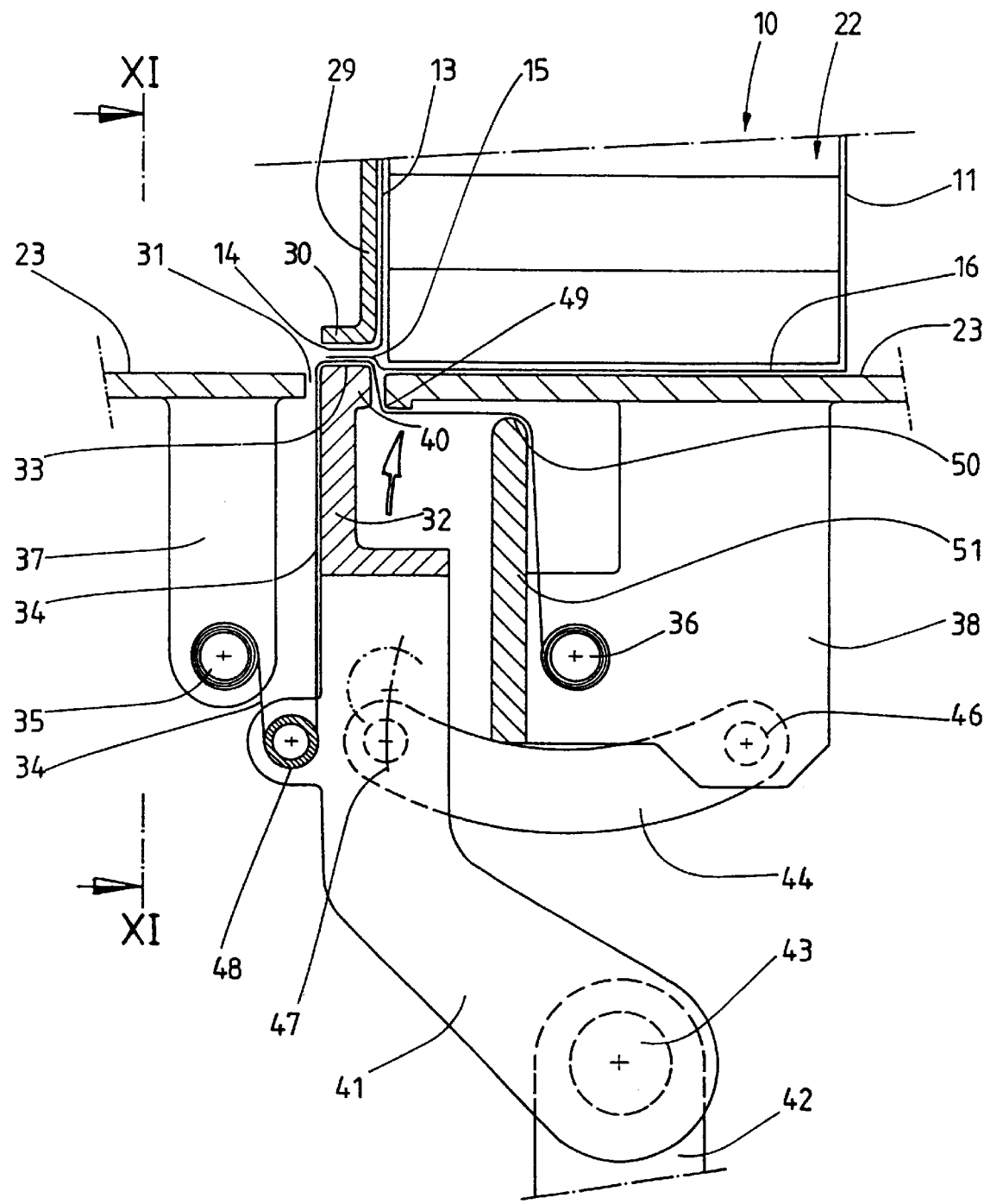

United States Patent [19]
Focke et al.

[11] Patent Number: 5,865,941
[45] Date of Patent: Feb. 2, 1999

[54] DEVICE FOR SEALING PLASTICS FILMS

[75] Inventors: Heinz Focke, Verden; Burkhard Roesler, Blender, both of Germany

[73] Assignee: Focke & Co. (GmbH & Co.), Verden, Germany

[21] Appl. No.: 661,988

[22] Filed: Jun. 12, 1996

[30] Foreign Application Priority Data

Jun. 13, 1995 [DE] Germany .................. 195 21 476.5

[51] Int. Cl.$^6$ ........................................ B30B 15/34
[52] U.S. Cl. ................. 156/443; 156/537; 156/583.1; 53/562; 493/209; 493/470
[58] Field of Search ........................... 156/537, 580, 156/583.1, 583.5, 443; 53/562; 493/189, 209, 470

[56] References Cited

U.S. PATENT DOCUMENTS

| | | | |
|---|---|---|---|
| 4,313,781 | 2/1982 | Rovigo | 156/530 |
| 4,954,206 | 9/1990 | Voss | 156/537 |
| 5,296,075 | 3/1994 | Hardigg et al. | 156/362 |
| 5,322,586 | 6/1994 | McLean | 156/358 |

FOREIGN PATENT DOCUMENTS

| | | |
|---|---|---|
| 7234088 | 2/1973 | Germany . |
| 2743494 | 9/1977 | Germany . |
| 9006292 | 6/1990 | Germany . |
| 9006292 | 10/1990 | Germany . |
| 9111714 | 1/1992 | Germany . |

OTHER PUBLICATIONS

Japanese 4–339737, Published Apr. 14, 1993, vol. 17, No. 191—Abstract.

*Primary Examiner*—James Sells
*Attorney, Agent, or Firm*—Abelman, Frayne & Schwab

[57] ABSTRACT

A device for sealing plastics films, particularly in batch packages (10) comprises a sealing jaw (32) and a sealing surface (33) thereon. In order to avoid the adhesion of residues of the film on the sealing jaw (32) or its sealing surface (34) during sealing of sealable plastics film in packaging technology, the sealing jaw (32) or sealing surface (33) is protected by a cover comprising a polytetrafluoroethylene (sold under the trademark TEFLON) strip (34). This TEFLON strip is so disposed and designed that it may be moved on from time to time relative to the sealing jaw (32) or sealing surface (33), so that unused areas of the TEFLON strip (34) pass into the sealing position to the required extent.

13 Claims, 7 Drawing Sheets

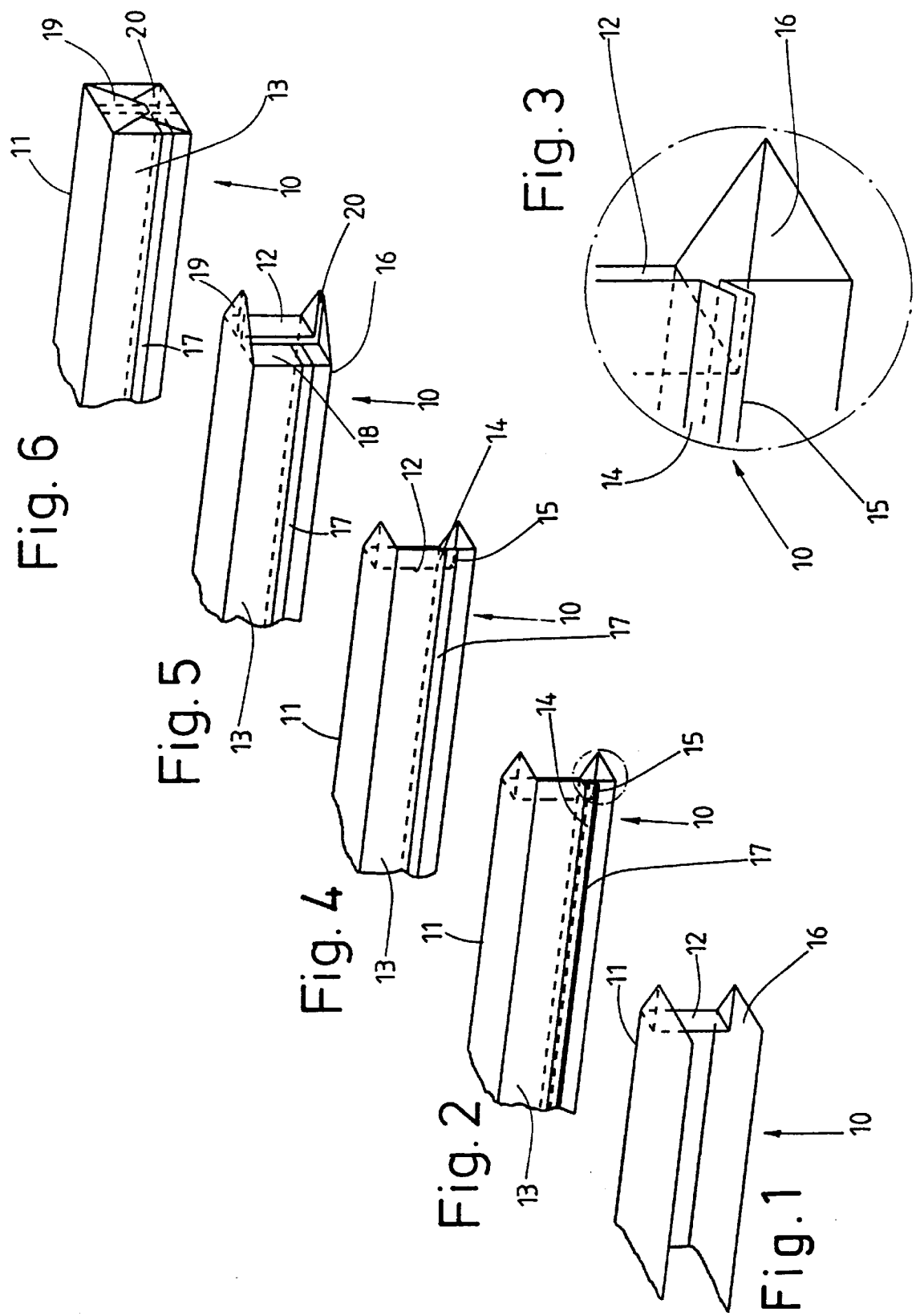

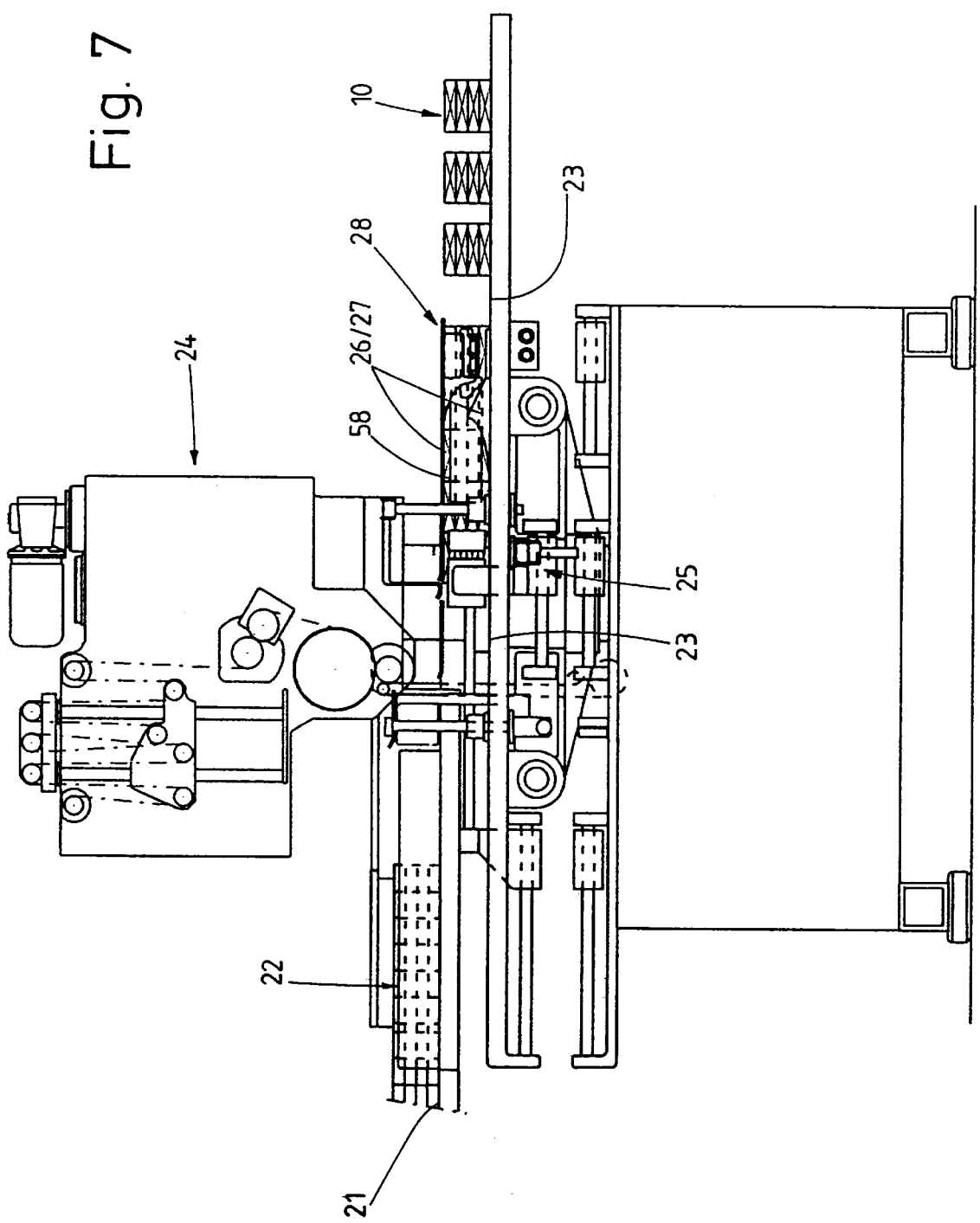

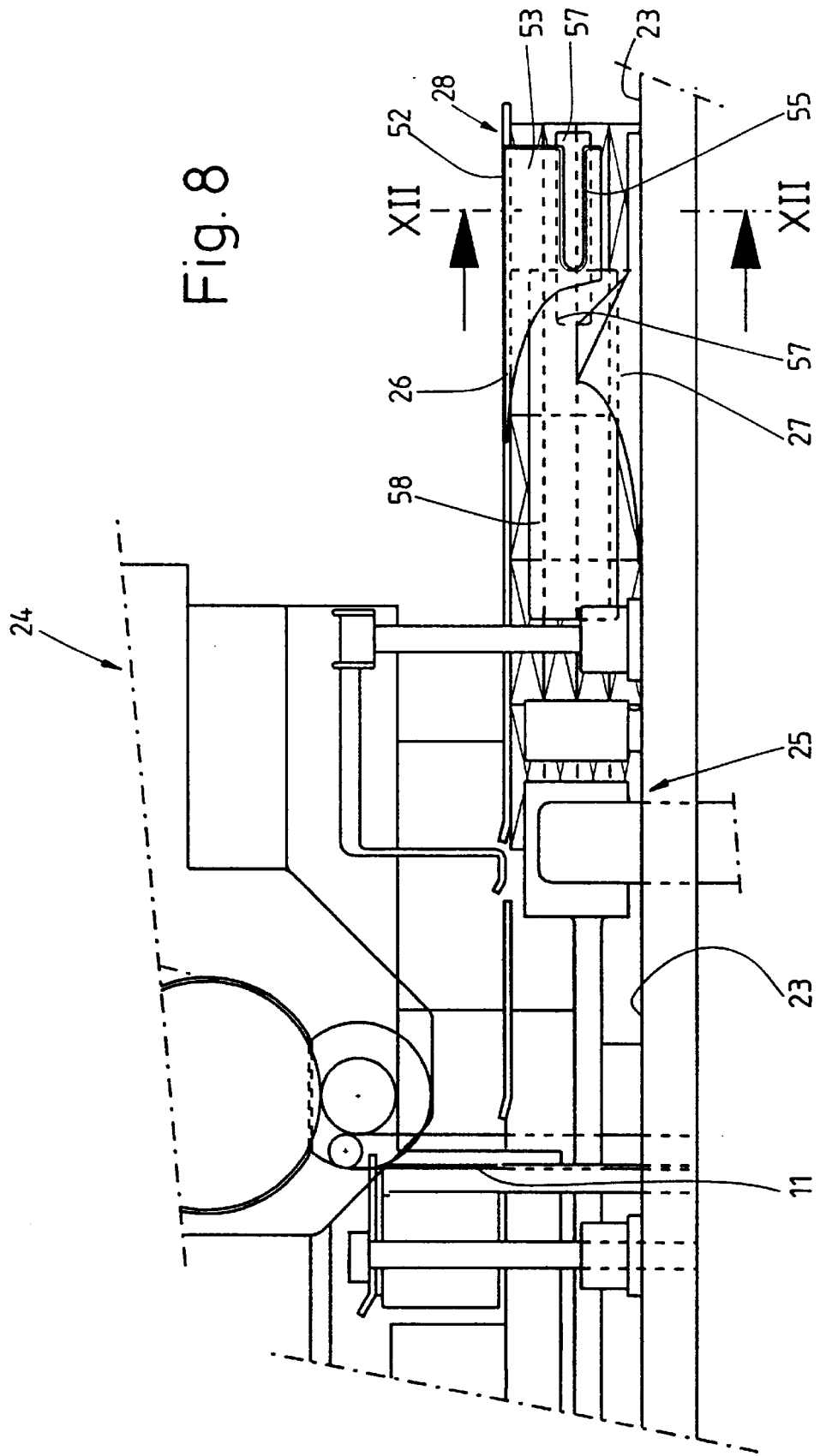

DEVICE FOR SEALING PLASTICS FILMS

DESCRIPTION

The invention relates to a device for thermally sealing or welding sealable or weldable workpieces, especially for manufacturing closure seams on a batch package formed from plastics film, with at least one sealing unit, particularly a sealing jaw, for transmitting heat and pressure to the regions of the work piece or of the plastics film to be sealed.

Thermal sealing or welding is used in packaging technology for connecting films. Sealing is used particularly in joining fold flaps of a wrapping made of film. The high performance of packaging machinery and the short cycle times involved require that high temperatures become effective within the shortest possible time. This in turn involves the risk that plasticised material of the workpieces remains adhering to the welding or sealing units.

Proceeding from this basis, the object underlying the invention is to design sealing units in such a way that, even during long-term operation, they are not exposed to the risk of adhesion of sealable material.

In fulfilment of this purpose, the device according to the invention is characterised in that there is arranged at least in the region of one sealing surface of the sealing unit an interchangeable covering, or one movable relative to the sealing unit, made of a material with non-adhesive properties, particularly Teflon.

According to the invention, therefore, the sealing jaw or another welding or sealing unit is provided in the region of the sealing surface with a coating preventing the adhesion of plasticised plastics material, particularly with a polytetrafluoroethylene (sold under the trademark TEFLON) coating, which is movable, so that from time to time a new or fresh area of the coating may be moved into the sealing surface.

More advantageously, the covering of TEFLON or the like is in the form of a strip or strip portion, as a TEFLON strip, which abuts with part of its surface on the seal surface of the sealing unit, and may be moved by a certain distance from time to time. This formation of the sealing unit is particularly suitable for producing closure seams, in the form of finned seams on batch packages for (paper) handkerchief packs. The seal surface of the seal jaw, covered by the TEFLON strip, can connect together fold flaps of the finned seam without adhesion, by an upward movement, and can then press the closure seam by a further upward movement against a side surface of the batch package.

A further theme of the invention is the sealing of fold flaps, particularly trapezoidal or triangular lateral flaps of such a packaging during transport of the same through fixed or stationary sealing units. In order to provide perfect sealing, there is provided according to the invention, during sealing of the fold flaps which partially overlap one another, a separating layer between said fold flaps on the one hand and an adjacent side wall of the wrapping on the other hand, particularly made from a material with non-adhesive properties. This separating layer, stationary relative to the movement of the packages, prevents undesirable sealing of the side flaps to be connected together to the side wall of the packaging.

Further features of the invention relate to the design of a sealing unit for closure seams or finned seams on the one hand and side flaps on the other hand.

Figure 10:
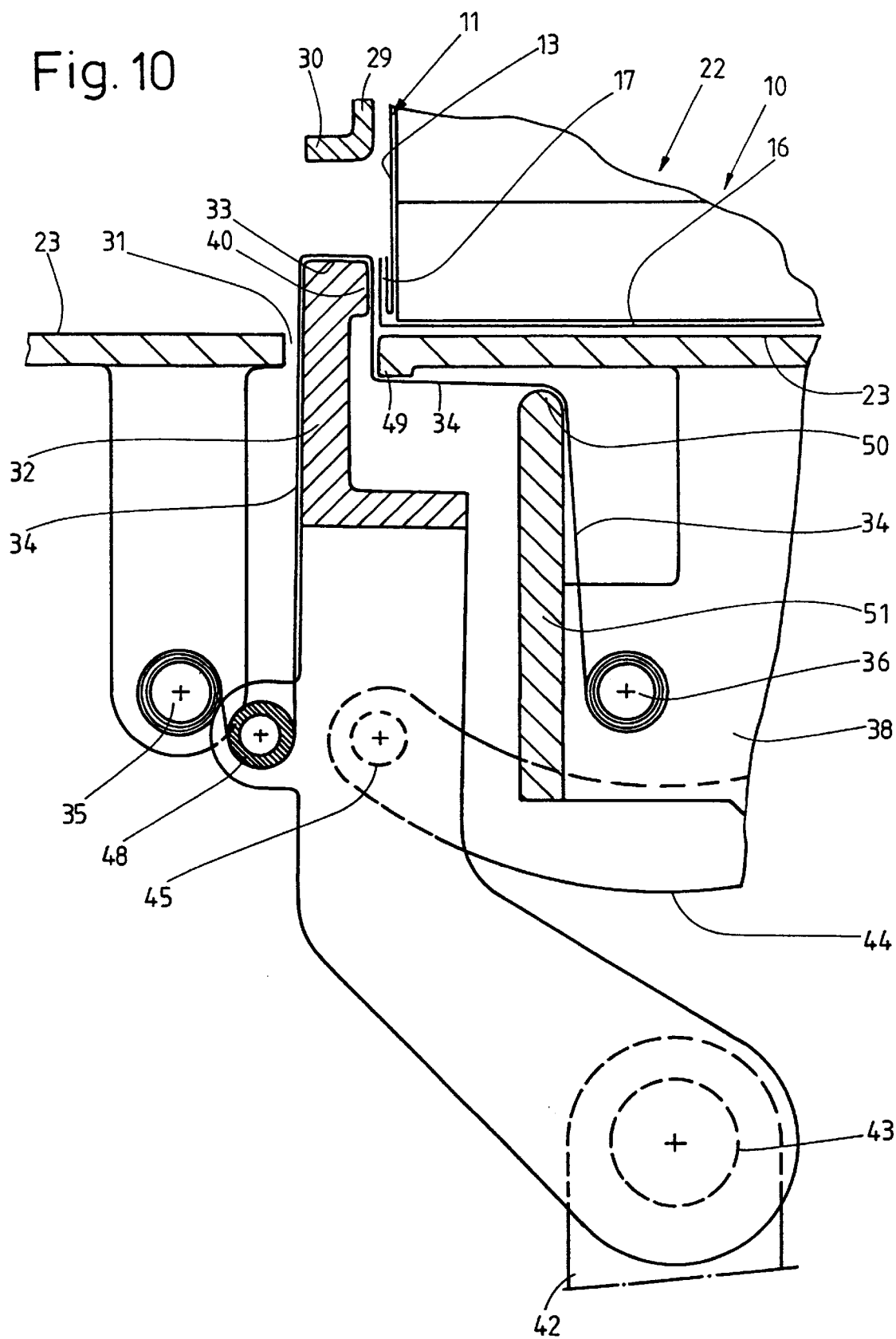
Figure 11:
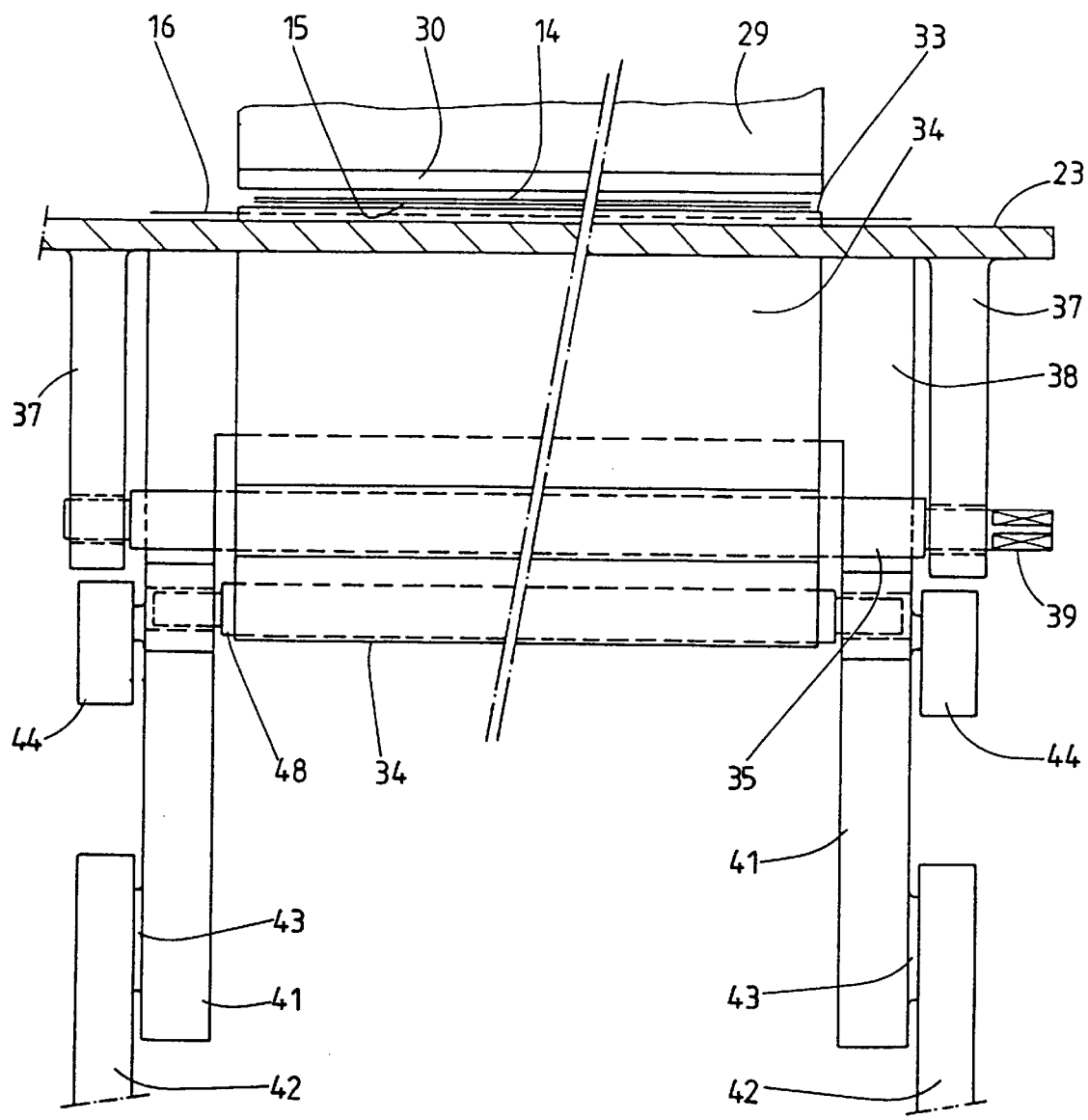
Figure 12:
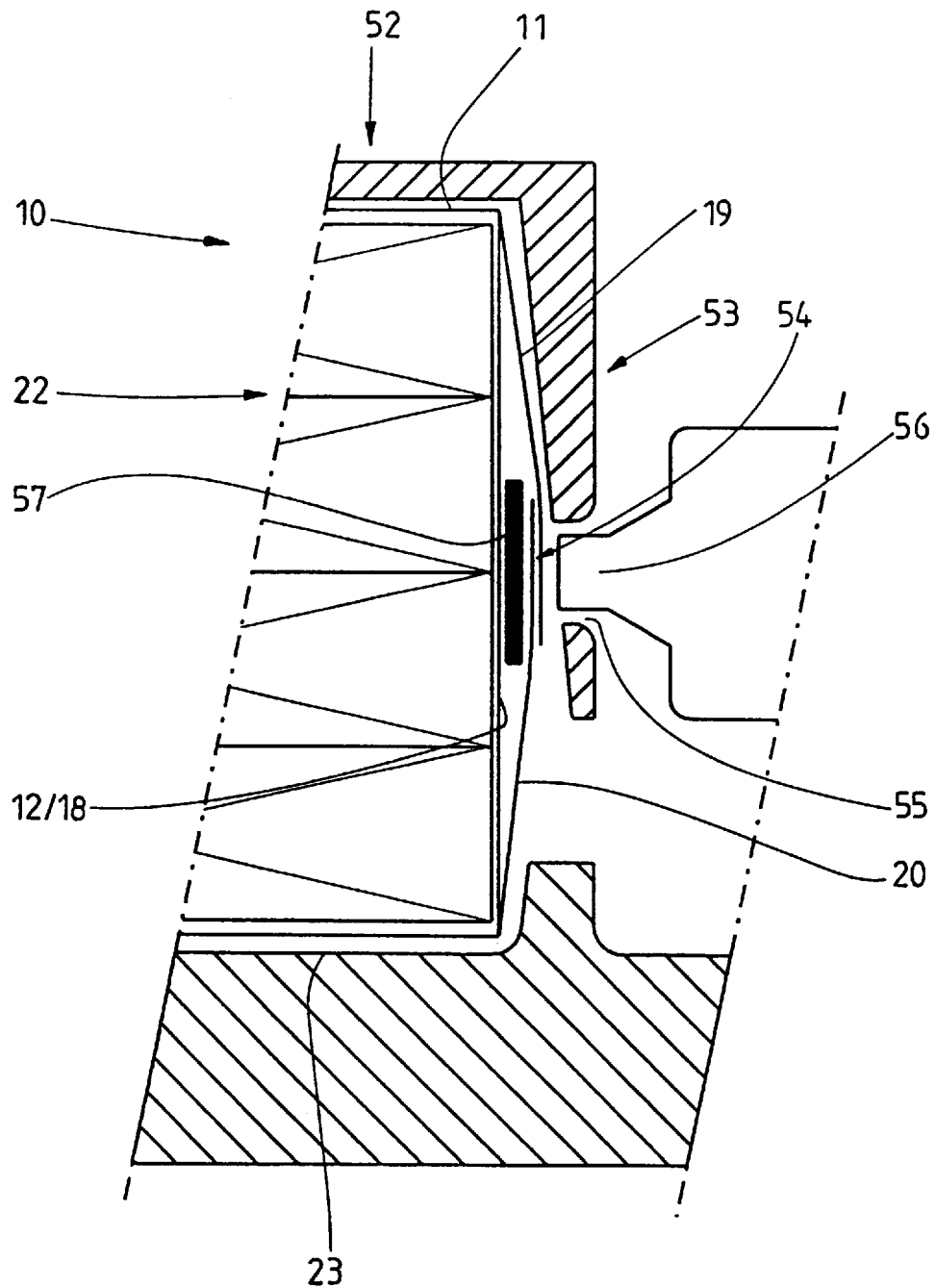

An embodiment of the invention given by way of example will be explained in more detail in the following with reference to the drawings, which show:

FIGS. 1 to 6: details of a (batch) packaging during the various manufacturing or folding stages, seen in perspective view;

FIG. 7: a device for producing packages according to FIGS. 1 to 6, in a diagrammatic side elevation;

FIG. 8: a detail of the device according to FIG. 7 in a side elevation on an enlarged scale;

FIG. 9: a sealing unit for closure seams in side elevation or in vertical section;

FIG. 10: the sealing unit according to FIG. 9 with a changed position of a sealing unit, in a further enlarged scale;

FIG. 11: the sealing unit according to FIG. 9 in a transverse view or in cross-section according to cross-sectional plane XI—XI in FIG. 9;

FIG. 12: a sealing unit for side flaps of the packaging in cross-section along the cross-sectional plane XII—XII of FIG. 8.

The details shown in the drawings relate to the production of batch packages 10 for a group of individual packagings, particularly (paper) handkerchief packages. The batch package and the device for producing the same extensively correspond to the subject matter of DE 39 07 615.

The individual packages of the batch package 10, formed into a cuboid group, are surrounded by an external wrapping 11, consisting of a plastics film which is weldable or sealable. A blank of the external wrapping 11 is held ready for this purpose in a vertical plane, in such a way that by means of a feed movement of the group of individual packages the blank is passed around these in a U-shape (FIG. 1). At the same time a forward lateral inner flap 12 is folded. The upper and lower arms of the U-shaped folded external wrapping 11 are then folded downward at the rear side of the group in such a way that a rear wall 13 is formed. Its edge is folded round in order to form an upper flap 14 projecting transversely rearwardly, or rearwards, to be connected with a lower flap 15 as an extension of a base wall 16 by thermal sealing. Thus there results a closure seam 17 in the form of a finned seam (FIG. 2, FIG. 3).

The closure seam 17 is then folded upwards against the rear wall 13 of the external wrapping 11, and likewise connected thereto by sealing it (FIG. 4). Now a tube-shaped formation is imparted to the external wrapping 11.

Next, rear inner flaps 18 are folded against laterally-aligned side surfaces of the group of individual packages, analogously to the inner flap 12. There thus result upper and lower triangular or trapezoidal external lateral flaps 19, 20. During further progress of the procedure, these are folded against the side surfaces of the batch package 10 or against the inner flaps 12, 18 (FIG. 5 or FIG. 6). The side flaps 19, 20 are of such dimensions that they overlap one another partially in a central region. They are likewise joined by sealing.

FIG. 7 shows in a simplified form a device for producing such a batch package 10. Individual packages are passed on to a packing track 21, forming a package group 22. This is lowered on to a folding track 23 which is at a lower level. In the region of this component, the blank 11 for the external wrapping is held in readiness, being fed from a blank device 24.

Thereafter, the package group 22 with the U-shaped folded blank is passed on the folding track 23 to a first sealing unit 25 of the closure seam 17. After completion of this, the batch package 10 passes into the region of the side folders 26, 27; connected to these is a further sealing unit 28 for the side flaps 19, 20. The completed batch packages 10 are thereafter transported away.

Details of the sealing unit 25 for the closure seam 17 are shown in FIGS. 9 to 11. According to these, there is provided in this region a folding web 29, which is movable from the top downwards, which grasps the upper, downward-facing leg of the U-shaped folded external wrapping 11, and, abutting on the package group 22, folds it downwards according to FIGS. 2, 3. The folding web 29 is provided on the lower edge with a pressure arm 30.

The folding track 23 is interrupted in the region of the sealing unit 25. A sealing unit, i.e. a longitudinally-extended sealing jaw 32, extending transversely to the folding track 23, can pass from below through a slot 31. The sealing jaw 32 cooperates with the sealing web 29 or the pressure arm 30. In the plane of the folding track 23 or slightly thereabove, the upper flaps 24 and lower flaps 15, projecting transversely or backwards, are joined by sealing. These flaps of the weld seam 17 are compressed between the pressure arm 30 and the sealing jaw 32 and are welded together by transmission of heat.

The sealing jaw 32 is heated to the necessary sealing temperature by heating elements not shown. An upper sealing surface 33 corresponds in its transverse dimensions approximately with those of the upper flaps 14 and lower flaps 15. In this region there is provided a covering of a non-adhesive material, particularly TEFLON. Physically, the covering consists of a TEFLON strip 34. This extends from one side of the sealing jaw 32 to the other, and is thus applied against the sealing surface 33. Accordingly, during sealing the TEFLON strip 34 comes into contact with the lower flap 15 and prevents it from adhering to the sealing surface 33.

The covering or TEFLON strip 34 are so formed and disposed that from time to time a new, "fresh" portion can be moved into the region of the sealing surface 33. Thus continuous full effectiveness of the cover is ensured.

In the present embodiment, the TEFLON strip 34 is a finite strip portion. This is wound at both ends on to rotatable carriers, i.e. on to rotatable rods 35, 36. These extend transversely to the folding track 23 and underneath it. The rods 35, 36 are rotatably mounted with their ends in fixed retaining means. The rod 35, positioned in the direction of conveyance in front of the sealing jaw 32, is mounted with its ends in retaining webs 37 beneath the folding track 23. The other rod 36 is mounted in a support framework 38 likewise connected to the folding track 23. At least one rod 35 is shaped at one free end for the application of an actuating tool, in the present case as a square portion 39 for a manually-actuated rotational tool for rotating the rod. In this way the TEFLON strip 34 is wound up by a certain portion on to the rod 35 and at the same time correspondingly unwound from the other rod 36. In every position of the sealing jaw 32, the rods 35, 36 are positioned underneath it, so that the TEFLON strip 34 runs like a loop over the sealing surface 33.

The sealing jaw 32, having an L-shaped cross-section, may be moved upwards and downwards. In a lower outset position, the sealing surface 33 is located beneath the plane of the folding track 23. In order to carry out a sealing cycle, the sealing jaw 32 is moved upwards into the sealing position shown in FIG. 9.

After joining upper flaps 14 and lower flaps 15, the folding web 49 is moved up into an upper position (above the path of movement of a subsequent batch package 10). Thereafter the sealing jaw 32 is moved further upwards into an upper end position according to FIG. 10. During this upward movement, the closure seam 17 formed is folded upwards and pressed against the rear wall 13 and, due to the simultaneously applied heat, joined to this rear wall 13 by sealing. For this purpose, the sealing jaw 32 is provided on the side facing the rear wall 13 with a projection 40, which reinforces the pressure of application. The Teflon strip 34 is thus also applied against the projection 40 and thus overlaps a laterally-aligned further sealing surface in the region of this projection 40.

The sealing jaw 32 is attached to actuating levers 41 (two in number, laterally positioned). These are movable upwards and downwards in common, in the present case by a lifting cylinder (not shown) whose piston rod 42 is connected by a link 43 to the lower end of the piston rod 42. In order to provide controlled guidance or steering of the movements of the sealing jaw 32, a guide 44 is connected to the actuating lever 41, via a rotary bearing 45. The lower end of the guide 44, in this case in an arcuate shape, is fixedly and pivotally mounted, in the present case by connection to the support framework 38. Here also a rotary bearing 46 is provided. The two rotary bearings 45, 46, in the sealing position (FIG. 9), are located approximately at the same height or on the same horizontal plane. By means of upward movement of the sealing jaw 32 with the guide 44, the latter executes a slight pivotal movement or sideways movement. This is ascribed to the fact that the rotary bearing 45 is moved along an arc of a circle 47. Thus the sealing jaw 32 or its projection 40 executes a sideways movement superimposed on the upward movement, so that the application of pressure for joining the closure seam 17 to the rear wall 13 is exerted.

During the upward and downward and sideways movement of the sealing jaw 32, the TEFLON strip 34 does not move relative to said sealing jaw 32. The portion provided rests immobile on the sealing surface 33. This is effected by a compensating loop of the TEFLON strip 34. A portion of the TEFLON strip 34, facing the rod 35, runs over a compensating roller 48, which is attached on the sealing jaw 32 or laterally on the angled actuating lever 41. The compensating roller 48, acting as a turning roller for the TEFLON strip 34, is rotatably mounted and is moved upwards and downwards synchronously with the sealing jaw 32. The free overall length of the TEFLON strip between the rods 35 and 36, i.e. the fixed end points, remains unaltered thereby.

On the side of the actuating lever 41 lying opposite the compensating roller 48, the TEFLON strip 34 is passed over further turning points, i.e. a turning edge 49 on the underside of the folding track 23 and a rounded upper edge 50 of an upright fixed support wall 51. This latter is connected to the support framework 38 in such a way that the upper edge 50 lies with a small spacing beneath the folding track 23.

In the region of the sealing unit 25, the sealing steps visible from FIGS. 2, 3 and 4 are carried out. Thereafter the partially completed batch package 10 is passed into the area of a folding station for folding over the upright inner flap 18 (FIG. 5), which is to the rear in the direction of conveyance. Thus there arise the triangular or trapezoidal upper and lower side flaps 19, 20; these are folded during transport of the batch packages 10 into the upright plane in order to form a portion of side walls of the batch package 10. For this purpose there serve the side folders 26, 27 in the shape of curved rails, also known as folding shunts.

The sealing unit 28 follows continuously with the side folders 26, 27. In the region of this unit the side flaps 19, 20 overlapping one another in a central region, are joined together by sealing (FIG. 12).

The continuation of the folding track 23 is provided in this area with an upper guide 52 which is U-shaped in cross-section. A downwardly-aligned side arm 53 of this upper guide 52 extends as far as an area beneath an overlap 54 of the side flaps 19, 20. The side arms 53 are provided with a slot-shaped recess 55, at the level of the overlaps 54. A sealing unit, i.e. a sealing jaw 56, passes through the recess 55, in order to join the side flaps 19–20 together in the region of the overlapping portion 54 by means of the application of heat and pressure.

During this sealing procedure it is intended to prevent partial areas of the side flaps 19, 20 from becoming joined to internally adjacent films, i.e. with film wrappings of the individual packages of the package group 22 and/or the inner flaps 12, 18. For this purpose a separating layer or a separating piece 57 is provided, made of a material with non-adhesive properties, particularly TEFLON. This strip-shaped separating piece 57 extends level with the sealing area, i.e. level with the overlapping 54 or the area of effectiveness of the sealing jaw 56 between the side flaps 19, 20 on the one hand and the inner flaps 12, 18 on the other hand. The separating piece 57 is in the form of a strip-shaped flexible member which, transmitting pressure through the sealing jaw 56, comes into contact with the side surface of the batch package 10, namely on the inner flaps 12, 18.

On both sides of the path of movement of the batch package 10 there is respectively fixedly mounted a separating piece 57. In the present embodiment, a lateral guide 58 is provided for the batch packages 10 in the region of the side folders 26, 27. This therefore relates to a stationary side wall, which extends over a portion of the conveyed path, which corresponds to the dimensions of a plurality of batch packages 10. In this case the height of the lateral guide 58 is so selected that the package group 22 is laterally grasped almost over its entire height, and in each case each layer of individual packages disposed one above the other. The thin-walled separator piece 57 is attached in the direction of conveyance to the end of the lateral guide 58 and thereto. The lateral guide 58 terminates in front of the recess 55. The separating piece 57 extends, in continuation of the lateral guide 58, in the region of the sealing unit 28. The lateral guide 58 is so positioned that it extends to the inner flaps 12, 18. The upper and lower side flaps 19, 20 are accordingly folded outwards against the lateral guide 58. In this way the separating piece 57, connected to the lateral guide 58, is automatically located in the area described between the fold flaps to be separated from one another.

The batch package 10 is completed with sealing in the region of the sealing unit 28.

We claim:

1. Device for thermally sealing or welding closure seams (17) formed by two closure flaps (14, 15) which are to be joined together on a batch package (10) formed from plastics film, characterized by the following features:
    a) having at least one sealing jaw (32, 56) for transmitting heat and pressure to regions of the closure seams (17),
    b) for sealing a closure seam (17), said closure seam (17) being laid between the sealing jaw (32) and a counter unit (29),
    c) there being disposed at least in a region of a sealing surface (33) of the sealing jaw (32) and interchangeable or displaceable covering made of a material with non-adhesive properties, namely a displaceable strip (34) with one longitudinal portion abutting on the sealing jaw (32),
    d) in a first step sealing the closure seam (17), said sealing jaw (32) moves against said counter unit (29),
    e) after the counter unit (29) is raised, the sealing jaw (32), in a second step, being movable further upwards and entraining and folding over the formed closure seam (17), and
    f) connected to the sealing jaw (32) or to an actuating lever (41) for the sealing jaw (32) is a compensating roller (48) for deflecting the strip (34) in such a manner that the compensating roller (48) is moved synchronously with the sealing jaw (32), with a free length of the strip (34) remaining unaltered between two holding members.

2. Device according to claim 1, characterized in that the counter unit (29) comprises a folding web with pressure arm (30) that can be moved form above against the sealing jaw (32) and that, after raising of the counter unit, the sealing jaw (32) being movable upwards along a rear wall (13) of the external wrapping (11) of the batch package (10) for the purpose of folding the closure seam (17) against said rear wall (13).

3. Device according to claim 2, characterized in that the sealing jaw (32), during the upward movement, at least during the portion of the movement for folding the sealed closure seam (17), is movable along an arc, in such a way that the sealing jaw applies pressure on the closure seam (17) against the rear wall (13) of the external wrapping (11).

4. Device according to claim 3, characterized in that the sealing jaw (32) or its actuating lever (41), during the upward movement, executes a translatory movement along an arc, with the actuating lever (41) being pivotally or articulately mounted with one free end, and being connected to the transversely-aligned guide (44), which effects the circular movement.

5. Device according to claim 1, characterized in that the strip (34) extends in its longitudinal direction in the direction of the space between the two closure flaps (14, 15) of the batch package (10) which are to be joined together; that the strip (34) is held on both ends by holding members; that said holding members lie opposite the counter unit (29), thus being arranged on the side of the sealing jaw (32); that one holding member and the compensating roller (48) are arranged on one side of the sealing surface (33) opposite to the closure seam (17); and that the compensating roller (48) is arranged at a greater distance from the sealing surface (33) than is the adjacent holding member.

6. Device according to claim 1, characterized in that the strip (34) can be withdrawn from a wound supply, namely by winding up the used portions in such a manner that an unused "fresh" area of the strip (34) abuts on the sealing jaw (32).

7. Device according to claim 6, characterized in that the strip (34) can be unwound from a rotatable rod (35) and to the same degree wound up on a rotatable rod (36) on an opposite side of the sealing jaw (32).

8. Device according to claim 1, characterized in that the strip (34) is a polytetrafluoroethylene strip.

9. Device according to claim 1, characterized in that the sealing jaw (32) is moved along the closure seam (17) for the purpose of laying down the closure seam (17) onto the package (10), with the longitudinal portion of the strip (34) that abuts the closure seam (17) remaining stationary relative to said closure seam, and that for this purpose the compensating roller (48) guides the strip (34) on one side of the sealing jaw (32) opposite to the closure seam (17).

10. Device for producing packages with an external wrapping (11) of plastic film which is weldable or sealable, the external wrapping (11) being folded in such a way as to form folding flaps in one region extending during the folding procedure in a direction of transport of the packaging, and potentially overlapping one another, characterized in that during the sealing of the partially overlapping folding flaps there is disposed between these partially overlapping folding flaps and the adjacent side wall of the packaging a separating layer of a material with non-adhesive properties, said separating layer being stationary at least with respect to movement in said direction of transport of the packaging.

11. Device according to claim 10, characterized in that said separating layer between folding flaps which are not to be joined together by sealing is formed as a separating piece (57) of polytetrafluoroethylene, which is strip-shaped and extends in the transport direction level with a sealing jaw (56).

12. Device according to claim 11, characterized in that, during production of the lateral regions of the batch package (10), inner flaps (12, 18), disposed firstly in the direction of transport to a front and a rear of the batch package (10), can be folded against the content of the package, namely against the package group (22), during further transport of the batch package (10) the inner flaps (12, 18) being positionable by a lateral guide unit, namely by a plate- or wall-type lateral guide (58), against whose outer side upper and lower side flaps (19, 20) can be folded, the separating piece (57) being further connected to the lateral guide (58), preferably as a continuation of the same in the region of the sealing jaw (56).

13. Device according to claim 12, characterized in that the sealing jaw (56) operates in the region of a lateral arm (53) of an upper guide (52) for the batch packages (10), and, for sealing, passes through a recess (55) in the lateral arm (53).

* * * * *